United States Patent [19]

Lee

[11] Patent Number: 5,798,587
[45] Date of Patent: Aug. 25, 1998

[54] COOLING LOOP STRUCTURE OF HIGH SPEED SPINDLE

[75] Inventor: Wen-Yeu Lee, Tainai, Taiwan

[73] Assignee: Industrial Technology Research Institute, Hsinchu, Taiwan

[21] Appl. No.: 787,093

[22] Filed: Jan. 22, 1997

[51] Int. Cl.$^6$ .................................................. H02K 9/00
[52] U.S. Cl. .......................... 310/58; 310/52; 310/54; 310/57; 310/59; 310/60 A; 310/64
[58] Field of Search .................... 310/52, 58, 60 A, 310/64, 57, 59, 61; 417/367, 902; 250/493, 493.1, 493.2

[56] References Cited

U.S. PATENT DOCUMENTS

| | | | |
|---|---|---|---|
| 4,576,555 | 3/1986 | Ashenfelter | 417/372 |
| 4,641,104 | 2/1987 | Blosser et al. | 328/234 |
| 4,995,789 | 2/1991 | Fujio | 417/360 |
| 5,220,233 | 6/1993 | Birch et al. | 310/156 |
| 5,328,344 | 7/1994 | Sato et al. | 418/85 |
| 5,519,269 | 5/1996 | Lindberg | 310/58 |
| 5,616,973 | 4/1997 | Khazanov et al. | 310/54 |

Primary Examiner—Steven L. Stephan
Assistant Examiner—Elvin G. Enad
Attorney, Agent, or Firm—W. Wayne Liauh

[57] ABSTRACT

A cooling loop structure of high speed spindle comprises three groups of cooling areas where the first group being the front bearing cooling area, the second group being the motor cooling area and the third group being the rear bearing cooling area. Cooling fluid from the cooling machine outlet, flows through the rear end of spindle into the front bearing cooling area, then flows into the motor cooling area, finally, after flowing into the rear bearing cooling area, it flows back into the inlet of cooling machine, thereby, forms a temperature-controlled cooling loop. The cooling loop needs only a setup of cooling fluid inlet and outlet at the rear end of spindle which can avoid being using too many exposed cooling pipes that result in space occupation and being inconvenient in the installation of spindle. There is a setup of O-ring with different diameters designed at both ends of cooling jacket in the spindle where the diameter of O-ring groove closed to the center of the spindle is smaller than the one closed to both ends of the spindle. Besides, the front bearing cooling area is designed to be an encircling structure with fluid flows axially and rotates radially such that it not only can effectively control the temperature rise of the front bearing area but also can reduce the volume of the front end of the spindle to facilitate in getting deeply into the work pieces to perform bore machining.

8 Claims, 7 Drawing Sheets

COOLING LOOP STRUCTURE OF HIGH SPEED SPINDLE

FIELD OF INVENTION

The present invention is related to a cooling loop structure for use with high speed spindle, particularly the one, by using cooling fluid passing through loops, to lower the heat energy generated by the friction caused by bearings' rotation and the impedance of the motor's coils of high speed spindle.

BACKGROUND OF THE INVENTION

As high speed spindle has been widely used in various single-function cutting machines, machining centers as well as other application areas, one of the important theme on the design of high speed spindle is how to effectively control the frictional heat generated by the relative motion at the front and rear bearings as well as the impedance heat generated by the motor coils during high speed rotation to avoid thermal deformation, thereby, affecting the performance of high speed spindle. And, the method mostly adopted is to make use of a cooling fluid flowing loop structure acting together with cooling machines that can carry away the heat energy generated by high speed rotation of spindle to avoid its deformation due to the thermal energy.

Figure 1:
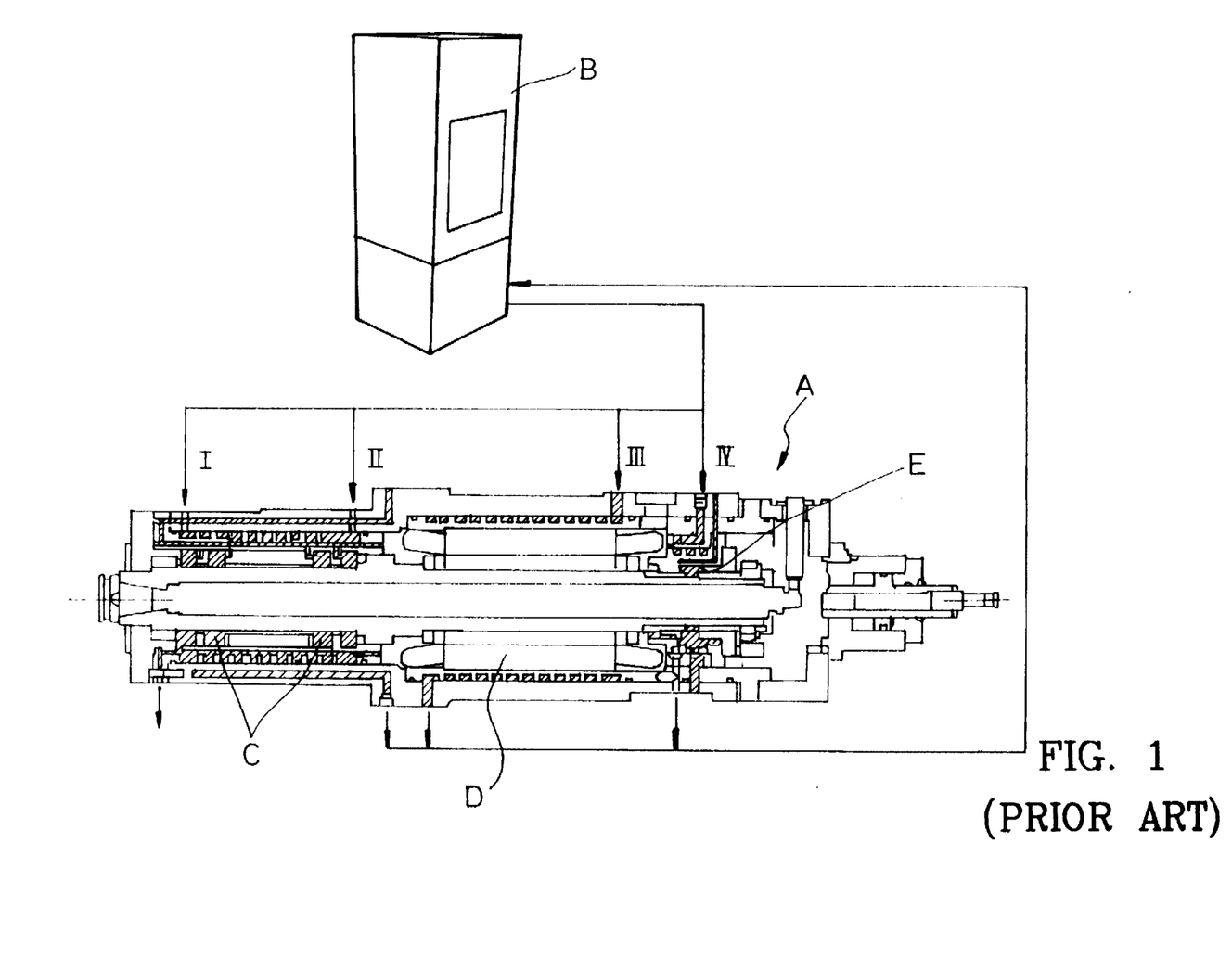
FIG. 1 shows the MITSUI SEIKI high speed spindle of prior art.

The conventional cooling loops of high speed spindle mostly make use of three groups of independent loops to cool off the front bearing, motor and rear bearing of spindle, also their piping are mostly connected individually from the outside. Take the high speed spindle A of MITSUI SEIKI of prior art for example (as shown in FIG. 1), its cooling loops are divided into four piping I, II, III, IV flowing respectively into the outer circumference of high speed spindle A to cool off the front and rear ends of its front bearing C, motor D and rear bearing E, what is more, the cooling loops of its front bearing C, motor D and rear bearing E are all independent and are not communicating one another.

However, this kind of design has various shortcomings of being apt to occupy space since its cooling piping are directly connected to the outside, and there are too many piping exposed which not only affect the installation of spindle but also result in the difficulty for a spindle to get into the work pieces to perform bore machining since the front end of the spindle is rather big in size.

Figure 2:
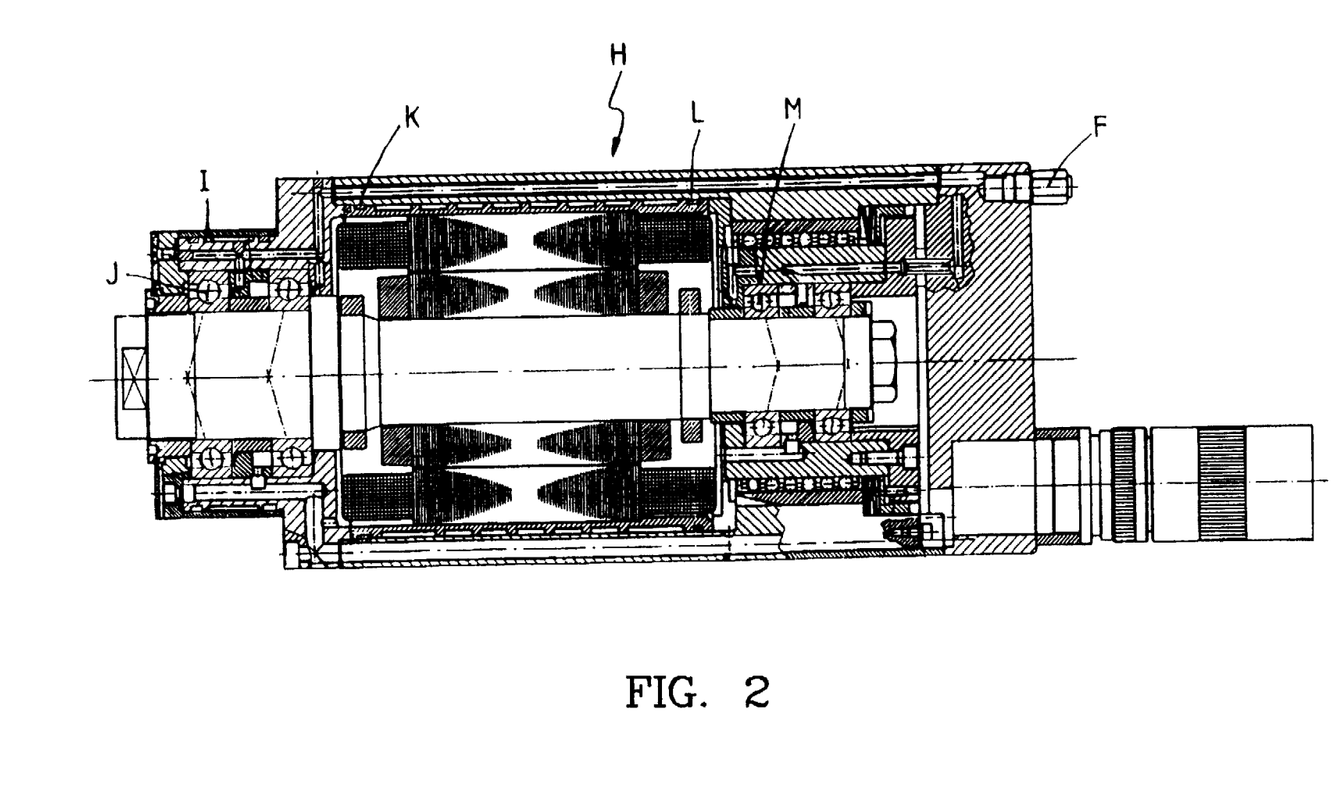
FIG. 2 shows the GMN high speed spindle of prior art.

Referring to FIG. 2, a prior art of German made GMN high speed spindle H, the inlet and outlet piping F of cooling loops are designed to be at the rear end of spindle, in this way, it can resolve the above-mentioned shortcomings of piping exposure and difficulty in spindle installation of the MITSUI SEIKI's high speed spindle A. But the cooling fluid flowing loop I at the front bearing of the GMN high speed spindle H flows only around the outer circumference of the front bearing J and locates too far away from the front bearing J, thereby, it can not effectly carry away the heat generated by the friction during high speed rotation, consequently, the rotating speed of the GMN high speed spindle H is limited. Also, the diameters of the grooves of the front and rear O-ring K, L of its cooling system are all designed to be the same, thereby, they are apt to be cut to damage by the edges of the inlet and outlet of cooling fluid, consequently, it will cause leaking. Besides, there is no cooling system at the rear bearing M, thereby, it is unable to control its temperature rise during high speed rotation.

SUMMARY OF THE INVENTION

The primary objective of the present invention is to provide a cooling loop structure of high speed spindle which comprises three groups of cooling area communicating one another where group 1 is the front bearing cooling area, group 2 is the motor cooling area and group 3 is the rear bearing cooling area. The cooling liquid flows from the outlet of a cooling machine through the rear end of the spindle into the front bearing cooling area, then passes through the motor cooling area, finally, after flowing into the rear bearing cooling area, it flows back into the inlet of the cooling machine to form a temperature control cooling loop. This cooling loop can avoid excessively exposed cooling piping that cause space occupation and inconvenience in spindle installation by simply setup an inlet and an outlet of cooling fluid at the rear end of the spindle. Besides, the present invention is equipped with O-ring having different diameters designed at both ends of the cooling jacket in the spindle where the diameter of the groove of the O-ring closer to the center of the spindle is smaller than the one closer to the front end of the spindle such that it can avoid being cut to damage, that results in leakage of cooling fluid, by the edges of the inlet and outlet of cooling fluid on the work of O-ring installation.

Another objective of the present invention is to provide a cooling loop structure for use in a high speed spindle where the cooling fluid flowing loop of the front bearing cooling area is designed to be an encircling structure such that the fluid flows in axially and rotates in radial directions which not only can more effectively control the temperature rise in the front bearing area but also can further reduce in the overall volume as compare with the cooling loop structure of the helically encircling type of prior art. It can effectively reduce the volume of the front end of high speed spindle to facilitate its getting deeply into the working pieces to perform bore machining.

One more objective of the present invention is to provide a cooling loop structure of high speed spindle where the cooling fluid flowing loop of the rear bearing cooling area is designed such that the inlet and outlet of cooling fluid staggers each other in a front-and-rear direction with an angle of 180 degrees apart can raise the cooling effect of the rear bearing area.

BRIEF DESCRIPTION OF THE DRAWINGS

The foregoing features of the present invention may be more fully understood from the following detailed description, read in conjunction with the accompanying drawings, wherein.

DETAILED DESCRIPTION OF THE PREFERRED EMBODIMENT

Figure 3:
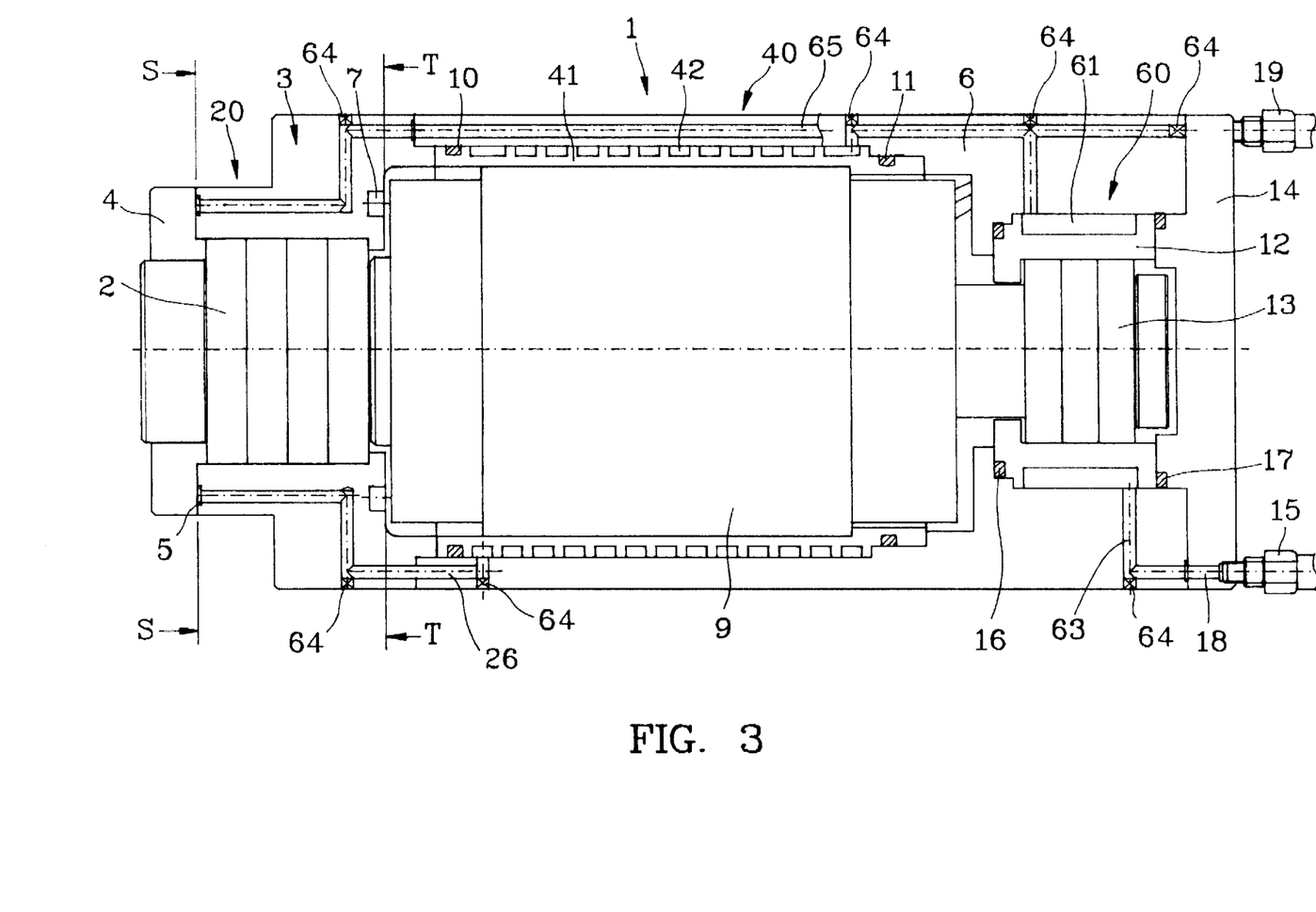
FIG. 3 is the sectional view of the cooling loop of high speed spindle of the present invention.
Figure 8:
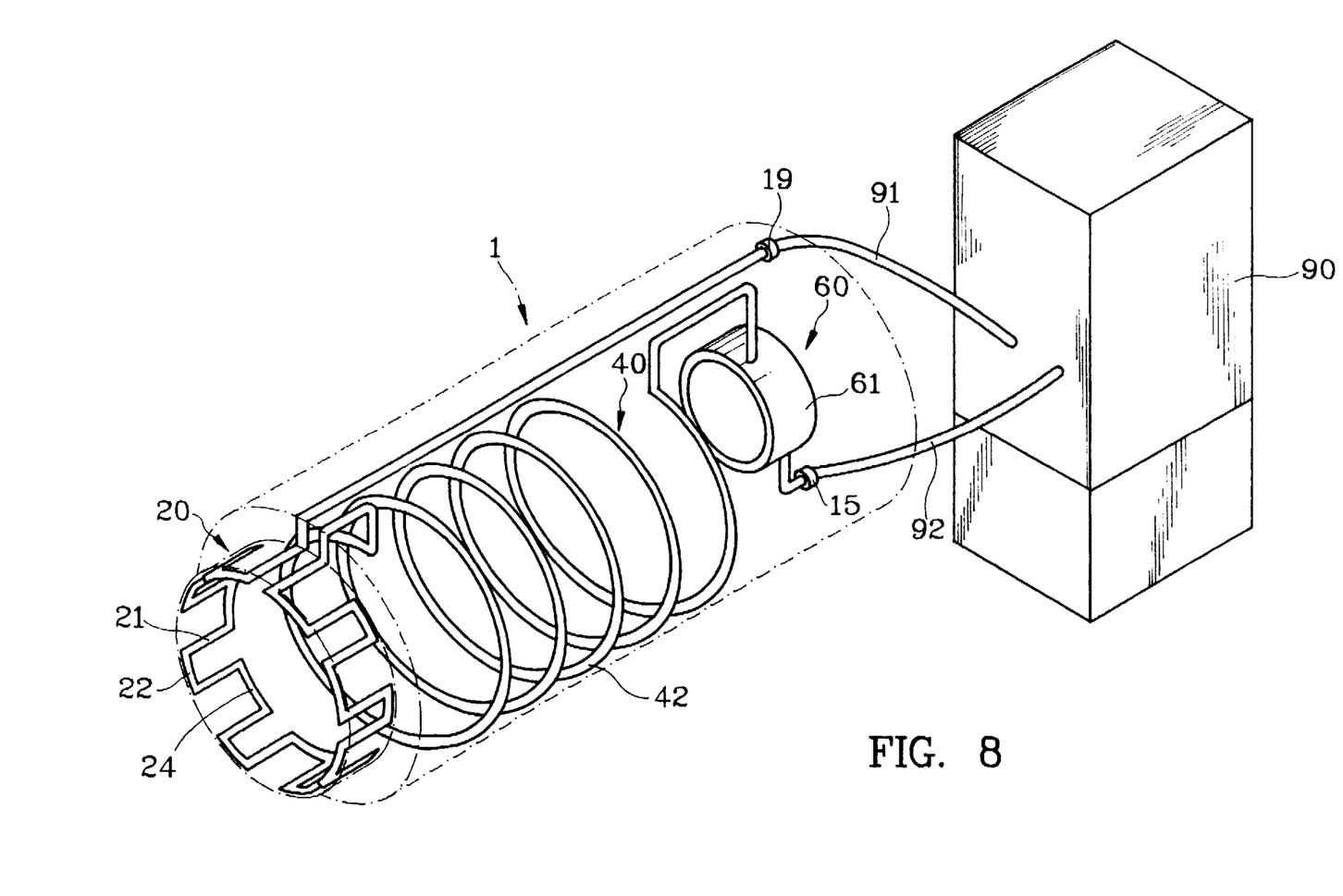
FIG. 8 is schematic diagram of the cooling loop of high speed spindle of the present invention.

Referring to FIG. 3, the cooling loop structure of high speed spindle 1 of the present invention mainly comprises three groups of cooling areas communicating one another, that is, front bearing cooling area 20, motor cooling area 40, and rear bearing cooling area 60. Cooling fluid coming out from the outlet of cooling machine 90 (as shown in FIG. 8) flows into front bearing cooling area 20, then motor cooling area 40, finally into rear bearing cooling area 60, then flows back into the inlet of cooling machine 90 to form a temperature-controlled loop. The pipe plug 64 is used to plug the pipe after the cooling piping are drilled to stop spilling of the fluid.

Figure 4:
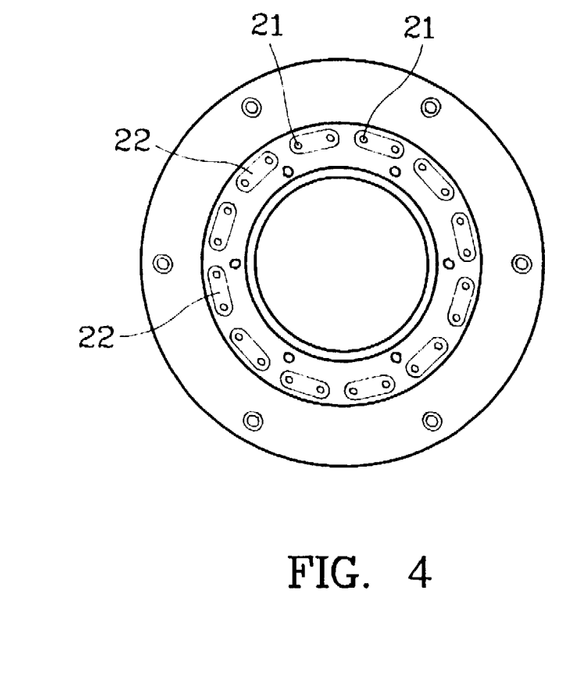
FIG. 4 is the S—S sectional view of the front bearing cooling area.
Figure 5:
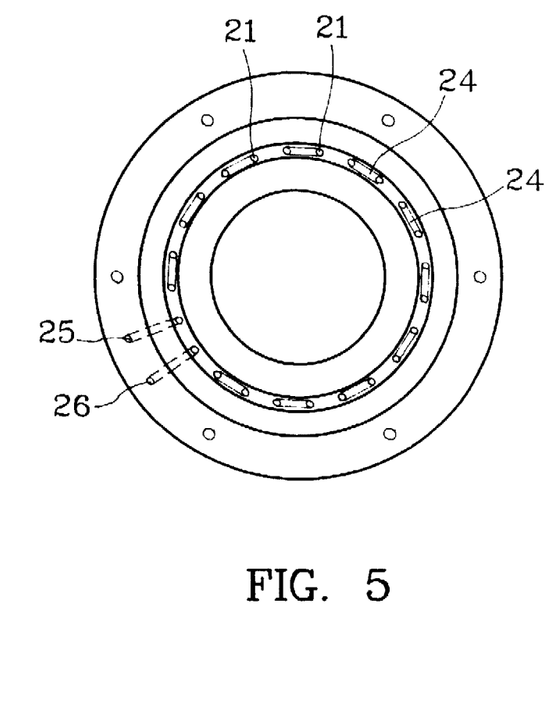
FIG. 5 is the T—T sectional view of the front bearing cooling area.

Referring to FIG. 4 and FIG. 5, the front bearing cooling area 20 comprises a plurality of axially penetrating holes 21 (see also FIG. 8) set up on the front bearing seat 3, a plurality of first chain like grooves 22 (see also FIG. 8) set up on the combined surface between the front end of front bearing seat 3 and fornt cover 4 tightened by screws, a plurality of second chain like groove 24 (see also FIG. 8) set up on the combined surface between the rear end of front bearing seat 3 and main body 6 tightened also by screws, a cooling fluid inlet 25, and a cooling fluid outlet 26 set up at the rear end of the front bearing seat 3. The cooling fluid infuses into the inlet 25 through the outlet pipe joint 19 of the cooling machine and passing the main body piping 65 to cool off the front bearing 2, then, flows through the outlet 26 into motor cooling area 40. The setup of the first and second chain like groove 22 and 24 can communicate with both of the neighboring axially penetrating holes 21 which makes cooling fluid flow through the chain like grove 22,24 into the neighboring axially penetrating holes 21. Also, the plurality of first chain like groove 22 and second chain like groove 24 are staggeringly distributed at the front and rear end of the front bearing seat 3, thereby, in accommodating with the plurality of the first, second chain like grooves 22,24, the plurality of axially penetrating holes 21 can make the fluid form a flow pattern with axial flow accompanied by radial rotation to encircle the outer circumference of the front bearing in the front bearing cooling area 20 which can effectively attain the efficacy of cooling the temperature rise of the front bearing of high speed spindle. Besides, there is a first O-ring 5 set up between the front bearing seat 3 and the front cover 4 of high speed spindle (i.e. at the S—S section) to attain tightly sealing effect, as well as a plug ring 7, set up between the front bearing seat 3 and the main body 6 of high speed spindle (i.e. at the T—T section) to plug the unused interrupted open groove beside the second chain like groove 24 to avoid leaking of cooling fluid. It is also sticked on by LOCTITL gel and left only an inlet 25 of cooling fluid which is connected to the cooling machine 90 (as shown in FIG. 8) through the piping on the main body 6 and rear cover 14; as well as a cooling fluid outlet 26 which is connected to the front end of the motor cooling area 40.

Figure 6:
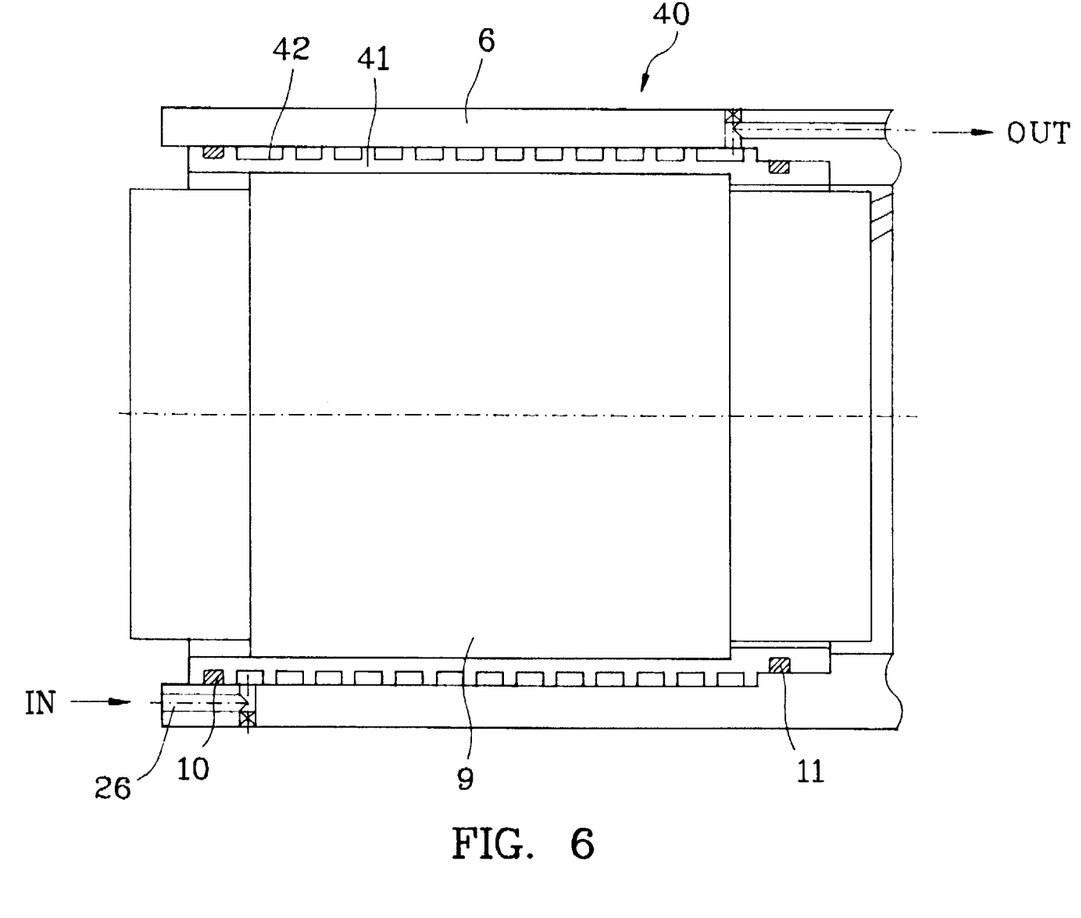
FIG. 6 is the sectional view of the motor cooling area.

Referring to FIG. 6, there is a setup of cooling jacket 41, which is installed between the main body 6 of the high speed spindle and the motor 9, in the motor cooling area 40. The outer circumference of the cooling jacket 41 has a setup of helical encircling path 42 where cooling fluid flows from the outlet 26 of the front bearing cooling area 20 into the front end of motor cooling area 40, then flows to the rear bearing cooling area 60 along the helical encircling path 42 to effectively carry away the heat energy generated by the high speed motor 9. Also, there are setups of second O-ring 10 and third O-ring 11 between both ends of the cooling jacket 41 and main body 6 to attain sealing effect, thereby, to protect the cooling fluid from being leaking. The diameter of the third O-ring 11 is designed to be a little bit smaller than that of the second O-ring 10 to avoid the O-ring being cut to be damaged by the edges of the inlet and outlet which are protruded beyond the main body 6.

Figure 7:
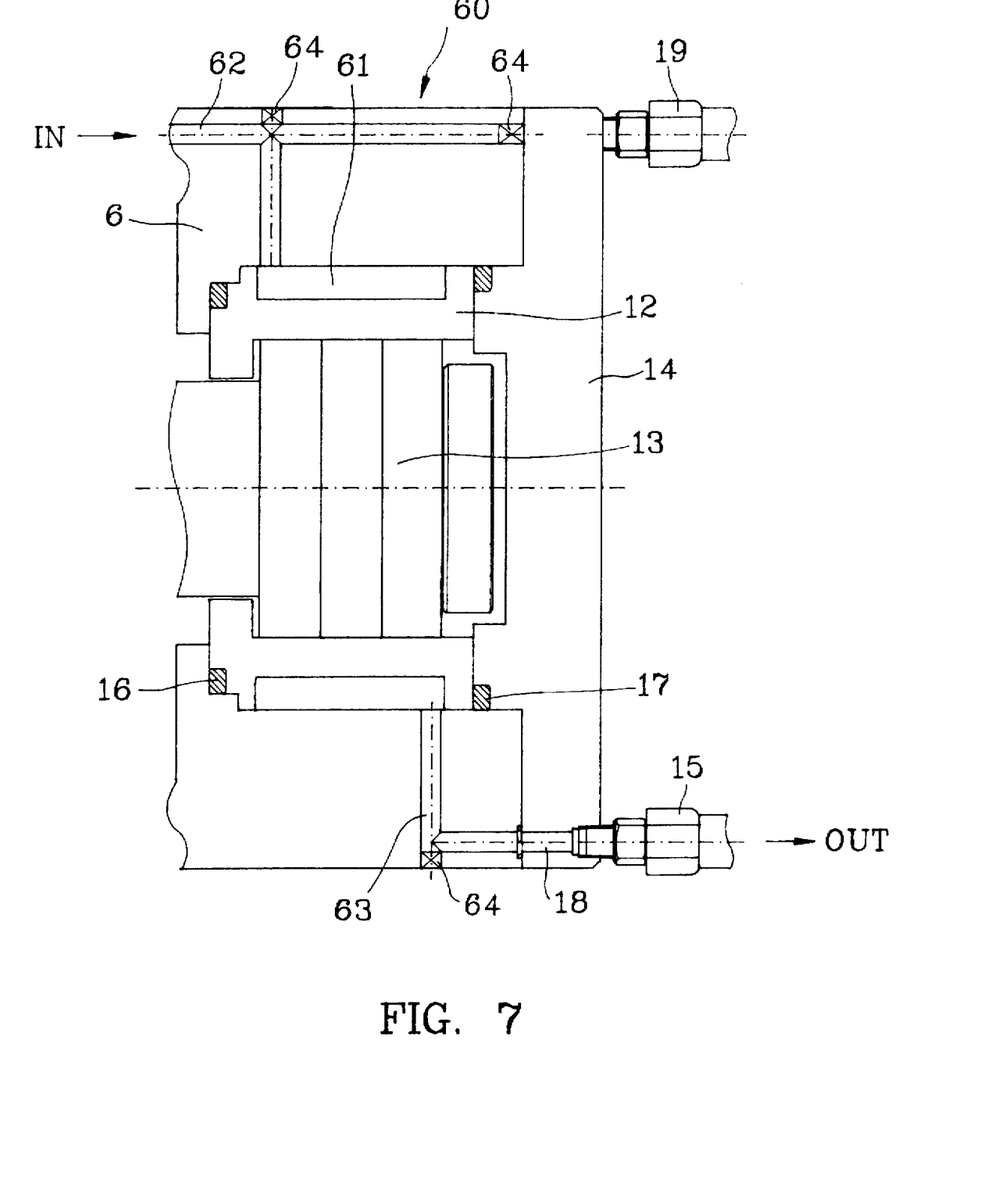
FIG. 7 is the sectional view of the rear bearing cooling area.

Referring to FIG. 7, the rear bearing cooling area 60 is mainly composed of a cylindrical encircling path 61 set up on the rear bearing seat 12. Cooling fluid flows out through the rear end of helical encircling path 42 into the front end of the cylindrical encircling path 61 in the rear bearing cooling area 60 through the main body piping outlet 63 on the main body 6 toward the rear end of the rear bearing seat 12 and flows out of a main body's outlet 63 at the rear end which is 180-degree staggered from the front end's piping, passing the rear cover pipe 18 on the rear cover 14 of high speed spindle into the cooling machine 90 (as shown in FIG. 8) through its inlet pipe 92 connected by the inlet pipe joint 15. Besides, there are a fourth O-ring 16 and a fifth O-ring 17 set up with different diameters at both the front and rear ends of the rear bearing seat 12 respectively, which can protect the O-rings 16,17 from being cut to damage by the edges of the inlet and outlet of the cooling fluid. Besides, when the O-ring 16,17 and the rear bearing seat 12 are installed to assemble with the main body 6, the rear bearing seat 12 is attached to the main body 6 first, then, the rear cover 14 is fixed to the main body 6 by screws and by the way of axial compression to press O-ring 16,17 to yield a much better sealing function. Cooling fluid passing through this rear bearing cooling area 60 can rotate to encircle the outer part of the rear bearing seat 12 to cool off the rear bearing 13 of high speed spindle to attain the efficacy of repressing the temperature rise of the rear bearing 13.

Referring to FIG. 8 and accompanied by FIG. 1, cooling fluid comes out from the outlet pipe 91, flows through the rear end of high speed spindle and the piping in the main body, then arrives the front bearing cooling area 20, thereafter, passing through the path formed by the axially penetrating holes 21 and chain like grooves 22,24 to encicles the outer circumference of the front bearing 2 with the way of axial flow and radial rotation, it enters the front end of the motor cooling area 40, rotates and encircles along the helical encircling path 42 of the outer circumference of the cooling jacket 41, afterward, it enters the front end of the rear bearing cooling area 60, flows toward the cylindrical encircling path 61 along the circumference of the rear bearing seat 12, then, flows out of the outlet at an 180 degree apart from the rear end. It finally flows through the piping of the rear cover 14 and pipe joint 15 into the inlet pipe 92 back to the cooling machine to form the cooling loop of temperature rise generated by front bearing 2, motor 9 and rear bearing 13 which can control the high speed spindle during the high speed rotation to protect against the deformation that result in damage, even hazard due to high temperature. As the cooling loop structure of high speed spindle of the present invention 1 needs only to set up an inlet and an outlet of cooling fluid by using three groups of cooling areas communicating one another in series in the spindle to effectively reduce the volume of high speed spindle and facilitate the installation of spindle. And because of its unique cooling loop design with axially penetrating hole 21 and chain like grooves 22,24, it can greatly reduce the volume of the front bearing seat area 3 which not only can facilitate the spindle to get deeply into the work pieces to perform bore machining but also its manufacturing cost is low. Therefore, the present invention can avoid having the shortcoming of occupying too much space of the prior art which adopt three independent loops. Besides, it can also avoid the disadvantages of being exposing too much piping, not easy to install spindle and unable to get deeply into the work pieces to perform bore machining.

Also, the present invention, with its unique O-ring design by using different diameters, can make the installation work of spindle a lot easier and the O-ring will not be cut to damage by the edges of inlet and outlet of the cooling fluid during the installation, unlike the O-ring of the prior art which uses same diameter that could result in damage and cause leaking of cooling fluid.

Furthermore, the manufacturing time of the present invention is shorter and its cost is lower and volume is even further reduced comparing with those of the prior art, since the unique design of axially penetrating holes 21 adopted by the front bearing cooling area 20, accommodating the first, second chain like groove 22, 24 communicating one to one respectively, needs only simple working to accomplish such as drilling and milling, unlike the helical encicling path of prior art which needs a separate setup of a cooling jacket and needs to perform alignment and working by using precise cutting machines. What is more, the front bearing cooling area 20, because cooling fluid can flow around its outer circumference closed to the front bearing 2, can raise the cooling effect of the front bearing to elevate the rotating speed of the high speed spindle without worrying about bad results caused by the temperatue rise.

Summarizing the above-mentioned statements, it is known that the present invention possesses the advantages of being small in overall volume, few exposed pipes, easy to install, small volume in front bearing end and easy to get deeply into the work pieces to perform machining, low manufacturing cost, good cooling effect and not easy to damage the O-ring etc.

Although the present invention has been illustrated and described previously with reference to the preferred embodiments thereof, it should be appreciated that it is in no way limited to the details of such embodiments, but is capable of numerous modification within the scope of the appended claims.

What is claimed is:

1. A cooling loop structure for use with a high speed spindle comprising a front bearing cooling area, a motor cooling area, and a rear bearing cooling area which are connected in such a manner that when a cooling fluid is sent out from a cooling machine, the cooling fluid first passes through said front bearing cooling area, then said motor cooling area and said rear bearing cooling area, and finally back to said cooling machine to carry away heat energy, and thereby, form a cooling loop structure;

wherein:

(a) said front bearing cooling area comprises a plurality of axially extending holes each having a front and a rear end, and a plurality of chain-like grooves alternately connecting said front and rear ends of said axially extending holes so that said cooling fluid travels said front bearing cooling area in an up-and-down and circumferential manner; and (b) said motor cooling area comprises a cooling jacket which is contained in said cooling loop structure with a first pair of O-rings of unequal diameters.

2. The cooling loop structure for use with a high speed spindle as claimed in claim 1 wherein said front bearing cooling area, said motor cooling area and said rear bearing cooling area are provided inside the spindle.

3. The cooling loop structure for use with a high speed spindle as claimed in claim 1 wherein said motor cooling area comprises a cooling jacket which is equipped with a helically encircling path.

4. The cooling loop structure for use with a high speed spindle as claimed in claim 1 wherein said rear bearing cooling area comprises a cylindrically encircling path around a rear bearing seat.

5. The cooling loop structure for use with a speed spindle as claimed in claim 1 wherein said rear bearing seat is contained in said cooling loop structure with a second pair of O-rings of unequal diameters.

6. The cooling loop structure for use with a speed spindle as claimed in claim 5 which further comprises a rear cover, wherein said rear cover and said rear bearing seat cooperatively squeeze said second pair of unequally-diametered O-rings in an axial direction.

7. The cooling loop structure for use with a speed spindle as claimed in claim 1 wherein said cooling jacket is equipped with a helically encircling path which is connected to an exit of said front bearing cooling area.

8. The cooling loop structure for use with a speed spindle as claimed in claim 1 wherein:

(a) said cooling loop structure further comprises a front end piping and an inlet for connecting said front bearing cooling area with a piping leading to said cooling machine;

(b) said rear bearing cooling area comprises a cylindrically encircling path around a rear bearing seat;

(c) said cooling jacket of said motor cooling area comprises a helically encircling path;

(d) said cylindrically encircling path has a front end which is connected to a rear end of said helically encircling path; and (e) an outlet setup, which is parallel with said front end piping, and is located at a rear end of said rear bearing seat.

* * * * *